Figure 1:
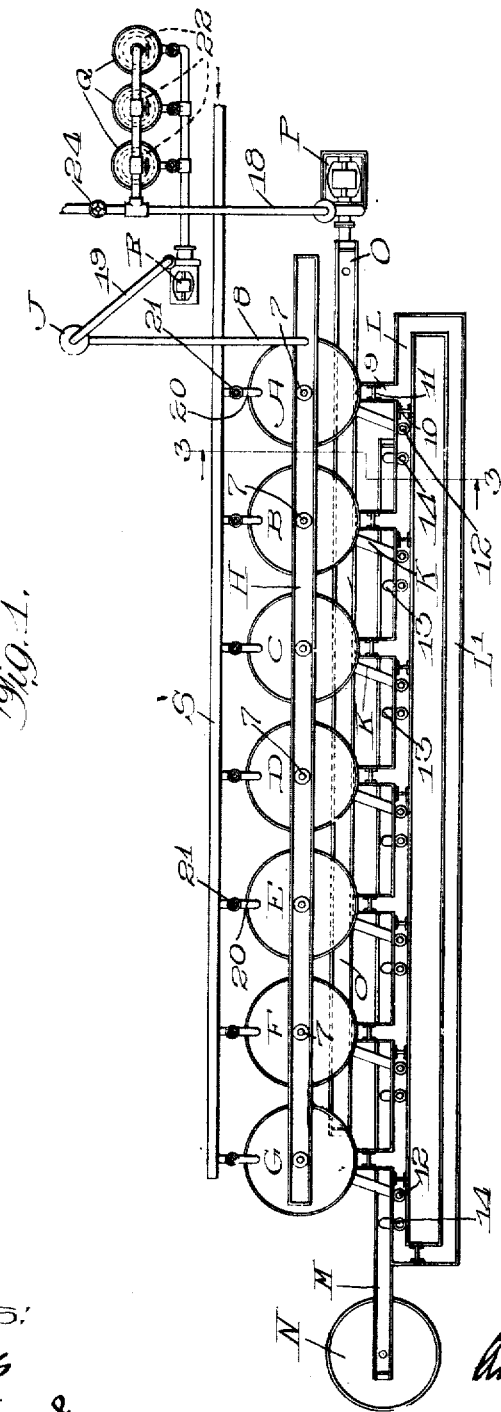

A. W. H. LENDERS.
PROCESS OF STEEPING GRAIN.
APPLICATION FILED JUNE 20, 1908.

948,514.

Patented Feb. 8, 1910.

UNITED STATES PATENT OFFICE.

ADOLPH W. H. LENDERS, OF WAUKEGAN, ILLINOIS.

PROCESS OF STEEPING GRAIN.

948,514.  Specification of Letters Patent.  Patented Feb. 8, 1910.

Application filed June 20, 1908. Serial No. 439,549.

*To all whom it may concern:*

Be it known that I, ADOLPH W. H. LENDERS, a citizen of the United States, residing at Waukegan, in the county of Lake and State of Illinois, have invented certain new and useful Improvements in Processes of Steeping Grain, of which the following is a specification.

My invention relates to the steeping of corn or other grain in the making of starch or in allied industries, and has for its object to provide a new and improved method of steeping whereby the later steps in the making of the starch are facilitated, a greater yield of feed products is obtained from the grain and whereby there is produced a starch of better quality than is the case when the methods ordinarily followed at the present time are employed.

In the making of starch it is the common practice to steep the corn in order to soften it preparatory to grinding. This is ordinarily done by bringing the corn into contact with an acid water, for example a dilute sulfurous acid, in vessels called steep tanks. The corn is allowed to stand in these vessels with the acid water for from twenty-five to fifty hours. Sometimes the corn and acid water are kept in agitation by a steam jet or centrifugal pump. The steep water is then drained off and the corn sometimes washed with fresh water, the drainings from the several tanks being afterward evaporated so as to reclaim the matters dissolved from the corn which are employed with materials coming from later stages of the starch process for the making of feed. This method of steeping the corn in tanks entirely separated one from another, the method universally employed up to the present time, has several disadvantageous features. It is impossible to steep the corn uniformly, as each tank has to be attended to separately. As a result, the corn coming from some of the tanks will be too hard while that coming from others too soft. Besides this, it has often been found that part of the corn of a single tank, due to insufficient circulation, will be softer or harder than other corn coming from the same tank. This is, of course, objectionable when it comes to the milling step of the process.

Under the old method of steeping it has not been found possible to obtain from the grain all of the soluble material it contains. A large part, probably half of such soluble materials, remains in the corn and goes through the various steps of the starch making process and finally goes to the sewer and is lost with the liquid from the settling tanks. The material thus lost in a large factory amounts to tons every day. Furthermore, because of ineffective steeping in the first stage of the process, the corn and starch require more careful washing during the later steps, in order that a pure grade of starch should be turned out.

My improved process provides for steeping the corn in a battery of connected steep tanks, through which the acid water is caused to flow either by gravity or by pumping, the steep water, when fully saturated with the soluble matters of the corn, being withdrawn from the last steep of the battery and conducted to suitable evaporating apparatus. In order that the process may be made continuous and uninterrupted and that the maximum of soluble matters may be withdrawn from the corn, I so arrange the steep tanks that they may be successively cut out of the battery in the same order in which they are connected thereto, the circulation of the steep water being continued through the remaining tanks, the tanks cut out being emptied, refilled and again connected into the battery as others are cut out, so that the old corn, that is, the corn which has been longest in the steep, shall receive the fresh acid water, while the fresh corn shall be first acted upon by the oldest steep water. Preferably the grain in the steeps cut out of the system is first allowed to drain and is then washed by the application of fresh water, the acid water drained from the corn going back into the other tanks. In this way I obtain, in the first place, perfectly uniform conditions throughout the whole battery of steeps and consequently uniformity in the softness of the corn. I also obtain a very large increase in the amount of soluble materials reclaimed. Experience has shown that the amount of soluble substances saved can be doubled. I also improve the quality of the yield of starch and facilitate the washing of the grain and starch at later stages of the process. Furthermore, the steeping process itself is made perfectly continuous and regular. The continuous flow I consider an important feature of the process; obviously, however, some of the advantages of my process would be retained even if the flow were interrupted at intervals, instead of being throughout continuous.

One form of apparatus for carrying out the process is illustrated in the accompanying drawings. The process is not limited, however, to the particular means shown for carrying it out. Other apparatus might be designed which would be equally effective.

Figure 2:
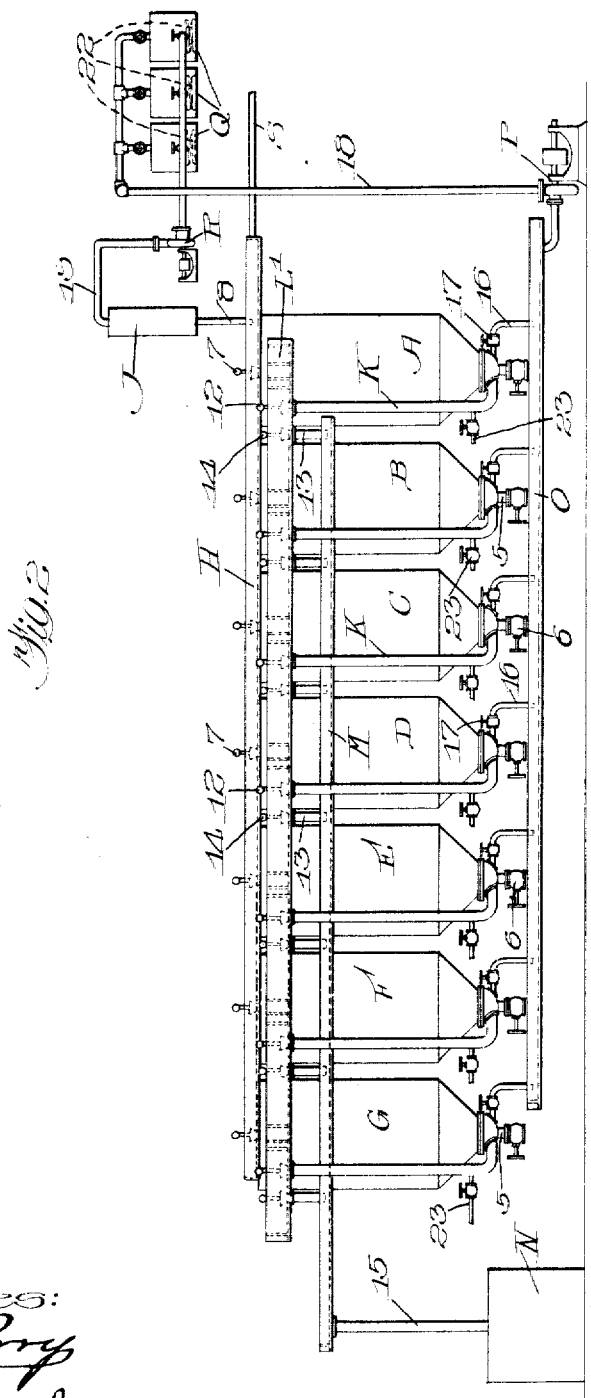
Figure 3:
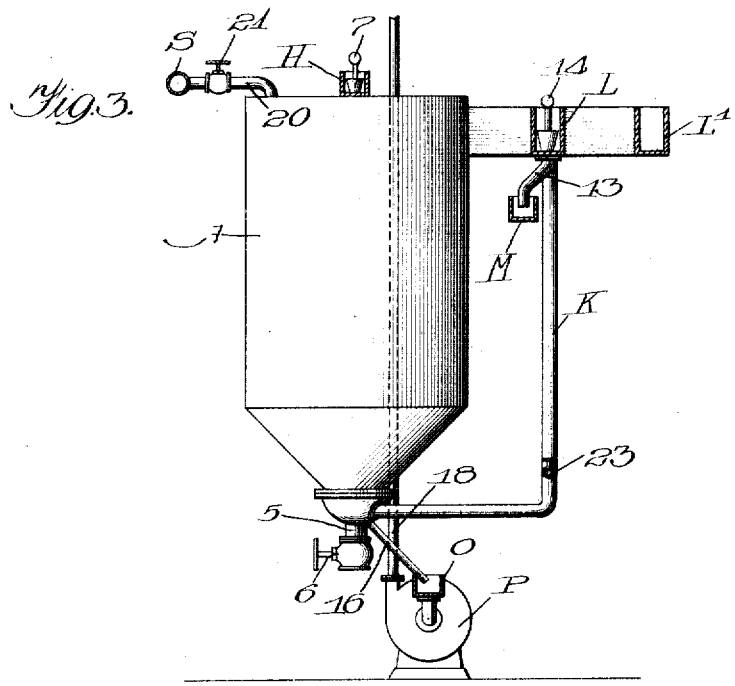
Figure 4:
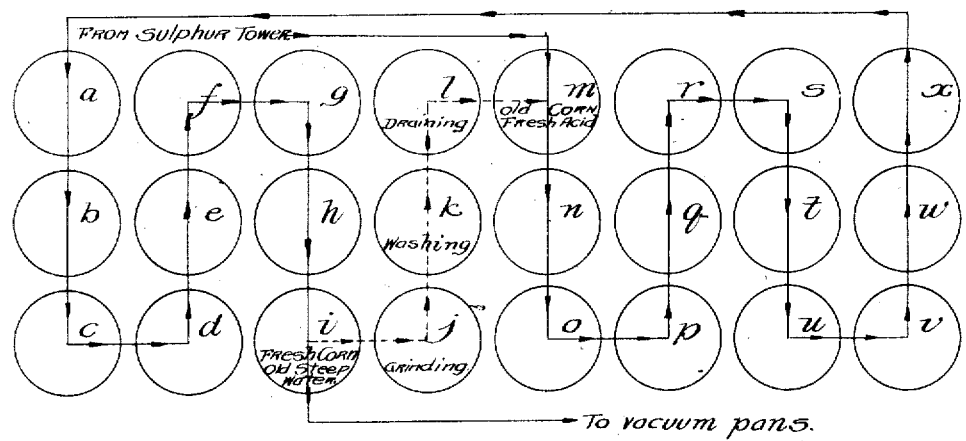

In the drawings, Figure 1 represents a plan view of the apparatus, certain parts of which are represented diagrammatically. Fig. 2 is a side elevation of the same. Fig. 3 is a vertical, sectional view on the line 3—3 of Fig. 1; and Fig. 4 is an illustrative diagram of a typical installation showing the course of the steep water.

Like characters of reference indicate like parts in the several figures of the drawings.

A, B, C, D, E, F, G are a series of steep tanks of ordinary construction having cone bottoms, the corn being discharged from each of the tanks through discharge pipe 5 controlled by valve 6 (Fig. 3). A trough H extends over the tanks having openings in the bottom thereof communicating with the several tanks, which openings are adapted to be closed by plugs 7. The acid water flows from the sulfur tower J, or other source of supply, to trough H by pipe 8 and into one of the tanks, the plug 7 closing the entrance to the other tanks of the battery. From the bottom of each of the tanks a pipe K leads up into a trough L, which runs the length of the battery and has branches 9 leading to the several tanks. The corn in tank A will be prevented from entering pipe K by a screen, or in any other manner. Trough L has the slide gates 10 and the branches are provided with slide gates 11. The entrances of pipes K to the trough may be closed by plugs 12. The return trough L' returns the steep water from tank G to tank A.

In order to carry off the saturated steep water from the last of the tanks, that is, the tank containing the fresh corn, a trough M is provided, into which lead pipes 13 extending from the bottom of trough L, the entrances to these pipes being closed by plugs 14 or other suitable valves.

N represents conventionally evaporating apparatus of any suitable sort connected with trough M by a pipe 15.

The several tanks are drained into a trough O through pipes 16 leading from the bottom of the tanks, these pipes being provided with valves 17, which are closed in each case while the steep water is being circulated through the tank in question. The acid water in trough O is pumped by pump P through pipe 18 to the storage tanks Q, whence it is forced by pump R through pipe 19 into the sulfur tower J, where the requisite amount of $SO_2$ is added.

Water is supplied to the several tanks for washing the grain through a pipe S having branch pipes 20 leading to the several steep tanks and controlled by valves 21.

In order to keep the acid water at the proper temperature, from 105° to 130° Fahrenheit, the tanks Q are provided with steam coils 22. If necessary, steam may also be injected into pipes K from steam pipes 23. Fresh water may be supplied to tanks Q through pipe 24.

By means of this apparatus, the process is carried out as follows: The tanks are filled in succession with corn and acid water. For example, the tanks may be constructed with a capacity of 2000 bushels of corn and 12000 gallons of acid water. When the tanks are thus filled, or that is such of them as are to be operated together, the addition of acid water will cause a gradual flow of the acid water through the tanks in succession, the acid water passing, let us say, from trough H into tank A, the entrances from the trough to the other tanks being closed by their plug valves 7, through the corn in tank A, up through pipe K, into trough L, through the branch trough leading into tank B, and so on through all of the tanks which are to be operated together, the gates 11 being opened to admit the acid water to the tanks and the gates 10 being closed to prevent back flow. Supposing all of the tanks to be in operation, the steep water will finally flow out of tank G into trough L, and from there into trough M and to the evaporating apparatus N, the plug 14 associated with tank G being removed, while the corresponding plugs for the other tanks are in place. When it is desired to cut any of the tanks out of the circulatory system, for instance when tank A is to be cut out, the opening from trough H into this tank will be closed and the plug removed from the opening into tank B, corresponding slide gate 10 being opened and gate 11 closed. By opening valve 17, the acid water in tank A may be drained out into trough O. This, of course, will be comparatively fresh acid water. It will be sent to the storage tanks Q and from there through the sulfur tower and back into circulation through the other tanks. During the steeping process the corn takes up a large amount of water, in the example taken about 4500 gallons of the 12000 original gallons of the acid water. In order to keep up the supply, it is, therefore, necessary to add fresh water to the circulatory system to make up this deficiency and for the steep water continually going to the evaporating apparatus. After the corn has been drained, it is preferably washed by the application of fresh water from pipe S. This water drains off through the pipe 16 and is pumped into the storage tanks Q. If desired, suitable apparatus may be provided for sending the water several times through the tank before it goes to pump P. The grain, when washed, may be drawn off through the discharge pipe 5 into cars or conveyers. Preferably the apparatus is operated with three adjacent tanks cut out of the system together. In one of these the corn is draining, in the next it is being washed and in the third it is being drawn off for grinding. When any of the middle tanks are cut out, the treatment of the batches of corn in the different tanks in their proper order is made possible because of the return trough L'.

Those features of my process by which the operation of steeping is made perfectly continuous, uniform and regular and by means of which the freshly supplied acid water is being continually brought into contact with the old corn, while the old, highly saturated acid water is withdrawn from the fresh corn, so that the acid water will have the greatest effect upon the corn and will dissolve out a maximum of soluble substances, is best shown in the diagram of Fig. 4, which represents an installation of twenty-four steep tanks lettered $a$ to $x$ inclusive, the arrangement of the tanks being somewhat different from the simplified arrangement of the other figures, which was adopted for purposes of convenient illustration. The full line with the arrows indicates the course of the steep water which enters the battery at tank $m$, which contains the corn that has been longest steeping, passes through all of the tanks included in the circulatory system and discharges through tank $i$, which contains the fresh corn, and from there goes to the vacuum pans. This diagram will represent the battery of steeps after it has been in operation some time. Tanks $j$, $k$ and $l$ are cut out. The corn is being removed from tank $j$. After that has been done, it will be filled with fresh corn and connected to tank $i$ so as to receive the old steep water, as indicated by the dotted line, when the tank $j$ will discharge to the evaporating apparatus instead of tank $i$. In tank $k$ the grain is being washed. This will be the next tank to be connected to the system following $j$. In tank $l$ the corn is being drained. When $j$ has been refilled and connected with the system, and while the grain from $k$ is being discharged for grinding and that in $l$ being washed, the tank $m$ will be cut out and allowed to drain, and so on throughout the battery.

I find that good results may be obtained when a battery of twenty-four steeps, of the capacity described, is so operated that one steep tank is cut out of the battery every hour and fifty minutes. The length of time which it is necessary to steep the corn and the strength of the steeping liquid may be varied in accordance with the condition of the corn to be steeped. Likewise the amount of steeping liquid supplied to the system per unit of time may be varied. This capacity for varying the rate of flow of the liquid through the steeps enables me to obtain just the right degree of saturation in the steep water as it flows from the last tank of the series. Obviously it is desirable to have the steep water going to the evaporating apparatus as heavy with the soluble substances of the corn as possible, as the reclamation of such soluble substances is thus facilitated and made less expensive. On the other hand, if the steeping liquid in the last few tanks is so nearly saturated as not to act to the fullest extent possible upon the soluble substances in the corn, the yield of such soluble substances is correspondingly lessened. By varying the amount of fresh water which is introduced into the storage tanks before each successive tank is cut out and the refilled tank added, the degree of saturation of the steep water from the last steep tank in operation may be controlled to a nicety. Such control is not a possibility under the old methods of steeping.

In the steps of the starch manufacture, subsequent to the grinding, large quantities of water are used, which, of course, leach out any soluble matters remaining in the starch. The water used in these subsequent steps is of such great volume that though it will contain, under the old method of steeping, a great deal of valuable matter, it does not commercially pay to evaporate the water so as to reclaim such matter. By my process of steeping, practically all of the soluble substances are removed from the corn during the first stage of the manufacture, the steeping step, in a heavy solution which can be economically evaporated. Moreover, I do away with the separate means for producing a circulation in the steep tanks which were necessary by the old methods. Also the continuous circulation through the tanks and from one tank to another is more easily regulatable and produces more even steeping of the grain, than where separate circulation or other agitations are set up in separate tanks. The grain in each tank is subjected to a great deal more water than is practically possible when the tanks are operated singly.

As a result of these improvements upon the method of steeping the corn before grinding, in the process of making starch, I obtain a steep water for the evaporating pans as heavily saturated with the soluble substances of the corn as it is possible to obtain, while, at the same time, utilizing the steep water to the fullest extent for the softening of the grain and the extraction of its soluble substances. As a result, the grain is uniformly steeped, the yield of soluble substances is increased, and the handling of the corn and the steep water materially facilitated. The process may be carried on continuously and may be controlled to a nicety.

The apparatus shown, it will be seen, provides for a gravity circulation of the steep water through the tanks. The circulation might, of course, be brought about by pumping the steep water from tank to tank. Also, if desired, the steep water may be allowed to stand in the tanks for a time after they have been filled; or it may be circulated several times through each tank before going on to the next tank. In such case the process would not be a continuous process in the sense that the flow of the liquid is uninterrupted; but would be continuous in the sense that the batches are successively treated by the same body of steep water.

The process has been described as applied to the steeping of corn in the first stage of starch making.

I claim:

1. In the making of starch the process of steeping the grain prior to grinding, which consists in causing the steeping liquid to be passed successively and continuously through a series of separately confined bodies of the grain, shutting off the steeping liquid from said bodies of the grain one after another, while continuing the circulation of the same through the other bodies, and draining and washing the bodies of the grain from which the steeping liquid is shut off.

2. In the making of starch the process of steeping the grain prior to grinding, which consists in causing the steeping liquid to be passed successively and continuously through a series of separately confined bodies of the grain, shutting off the steeping liquid from said bodies one after another, while continuing the circulation of the same through the other bodies, draining and washing the bodies of the grain from which the steeping liquid has been shut off, and returning the liquid drained from said bodies to the circulation of steeping liquid through the other bodies.

3. In the making of starch the process of steeping the grain prior to grinding, which consists in causing the steeping liquid to be passed successively and continuously through a series of separately confined bodies of the grain, shutting off the steeping liquid from said bodies singly and in the same order of succession, while continuing the circulation of the same through the other bodies, causing the steeping liquid from said bodies to be passed successively through newly added bodies of the grain, and draining and washing each body of the grain after the steeping liquid has been shut off from the same.

4. In the making of starch the process of steeping the grain prior to grinding, which consists in confining the grain to be steeped in a battery of steep tanks, causing the steeping liquid to be supplied continuously to and passed through the units of said battery in succession, in the same order of succession cutting the units out of the circulatory system so formed in the battery, draining and washing the grain, removing the same, refilling the units with new grain and reconnecting them in said battery, and returning the liquid drained to the circulatory system through the other units of the battery.

5. In the making of starch the process of steeping the grain prior to grinding, which consists in confining the grain in a battery of steep tanks, causing a steeping liquid consisting of water and sulfurous acid to be passed through the units of said battery in succession, cutting the units out of the circulatory system so formed in the battery singly, draining and washing the grain in the units cut out of the circulatory system, and causing the acid water which is drained from said units to be recharged with sulfurous acid and returned to said circulatory system.

6. In the making of starch the process of steeping the grain prior to grinding, which consists in causing a steeping liquid to be continuously supplied to the first of a series of separately confined bodies of grain, withdrawing said liquid continuously from said body and bringing it without interruption of the flow into contact with the second body of said series, and so on throughout the series, withdrawing said steeping liquid together with the soluble substances in the grain in solution therewith from the last body of said series, and controlling the rate of supply of liquid to the material so as to control the degree of saturation of the steeping liquid withdrawn from the last body of said series.

7. In the making of starch the process of steeping the grain prior to grinding which consists in confining the grain to be steeped in a battery of steep tanks, causing an acid water to be supplied continuously to, circulated continuously through the units of said battery in succession and withdrawn from the last of said units, cutting the units out of the circulatory system thus formed in the same order of succession, draining and washing the grain in the units thus cut out, and refilling and connecting said units successively to the outlet end of said circulatory system, returning the acid water of the draining and washing steps to the circulatory system and maintaining the steep water in circulation at a relatively uniform temperature.

8. In the making of starch the process of steeping the grain prior to grinding, which consists in causing an acid water to flow in a continuous stream into contact successively with a series of bodies of grain so that it becomes gradually more heavily charged with the soluble substances of said grain, cutting said bodies in succession out of contact with the stream of acid water and at the same time causing the stream to flow into contact with successive fresh bodies of grain in such a manner that the acid water is always flowing through a plurality of said bodies, while a plurality of said bodies are always cut out of contact with the same.

9. In the making of starch the process of steeping the grain prior to grinding, which consists in causing an acid water to flow in a continuous stream into contact successively with a series of bodies of grain so that it becomes gradually more heavily charged with the soluble substances of said grain, cutting said bodies in succession out of contact with the stream of acid water and at the same time causing the stream to flow into contact with successive fresh bodies of grain in such a manner that three of said bodies are always out of contact with the stream of acid water, and causing said bodies to drain, to be washed, to be drawn off in the order in which they are cut out.

10. In the making of starch the process of steeping the grain prior to grinding which consists in causing a continuous stream of acid water to flow into contact successively with a series of bodies of grain, cutting said bodies in succession out of contact with said stream and at the same time causing the acid water to be continuously brought into contact with fresh bodies of grain, washing the bodies of grain as they are cut out with fresh water, removing the liquid from said washing therefrom, recharging it with acid and returning it to the stream of acid water flowing through the other bodies.

11. In the making of starch the process of steeping the grain prior to grinding which consists in causing a continuous stream of acid water to flow into contact successively with a series of bodies of grain, cutting said bodies in succession out of contact with said stream and at the same time causing the acid water to be continuously brought into contact with fresh bodies of grain, washing the bodies of grain as they are cut out with fresh water, removing the liquid from said washing therefrom, recharging it with acid and returning it to the stream of acid water flowing through the other bodies, continuously drawing the acid water charged with the soluble properties of the grain from the last of said bodies of grain and causing it to be evaporated.

12. In the making of starch, the process of steeping grain prior to grinding, which consists in causing the steeping liquid to be passed in succession through a series of separately confined bodies of the grain, shutting off the steeping liquid from said bodies in the same order of succession while continuing the treatment of the other bodies, causing the steeping liquid from said bodies to be passed in succession through newly added bodies of the grain, and as the steeping liquid is shut off from each such body, allowing the steeping liquid therein to drain off and thereafter causing fresh water to be passed through said body so as to wash the same.

13. In the making of starch, the process of steeping grain prior to grinding, which consists in causing the steeping liquid to be passed in succession through a series of separately confined bodies of the grain, shutting off the steeping liquid from said bodies in the same order of succession while continuing the treatment of the other bodies, causing the steeping liquid from said bodies to be passed in succession through newly added bodies of the grain, and as the steeping liquid is shut off from each such body, allowing the steeping liquid therein to drain off and thereafter causing fresh water to be passed through said body so as to wash the same, and introducing the wash water from said body into the steeping liquid with which the bodies under treatment are being treated.

14. In the making of starch, the process of steeping grain prior to grinding, which consists in causing the steeping liquid consisting of water charged with an acid to be passed in succession through a series of separately confined bodies of the grain, shutting off the steeping liquid from said bodies in the same order of succession while continuing the treatment of the other bodies, causing the steeping liquid from said bodies to be passed in succession through newly added bodies of the grain, and as the steeping liquid is shut off from each such body, allowing the steeping liquid therein to drain off and thereafter causing fresh water to be passed through said body so as to wash the same, and charging the wash water from such bodies with acid and introducing it into the steeping liquid with which the bodies under treatment are being treated.

15. In the making of starch, the process of steeping grain prior to grinding, which consists in causing the steeping liquid to be passed in succession through a series of separately confined bodies of the grain, shutting off the steeping liquid from said bodies in the same order of succession while continuing the treatment of the other bodies, causing the steeping liquid from said bodies to be passed in succession through newly added bodies of the grain, and as the steeping liquid is shut off from each such body, allowing the steeping liquid therein to drain off and thereafter causing fresh water to be passed through said body so as to wash the same, and heating the steeping liquid at intervals as it passes through said bodies of grain so as to maintain it at a temperature from 105° to 130° Fahrenheit.

16. The process of steeping the grain prior to grinding in the manufacture of starch, which consists in confining the grain in a battery of steep tanks, introducing into the first unit of said battery a dilute solution of sulfurous acid at a temperature of from 105° to 130° Fahrenheit, withdrawing the acid water from the first unit and introducing it into the second unit, and so on throughout the battery, shutting off the acid water from the units in succession when the grain has been properly steeped, withdrawing the grain therefrom, refilling the same with grain and introducing acid water previously used into such bodies of fresh grain, and introducing fresh acid water into the units containing the partially steeped grain.

17. The process of steeping grain prior to grinding in the manufacture of starch, which consists in confining the grain in a battery of steep tanks, introducing into the first unit of said battery a dilute solution of sulfurous acid, withdrawing the acid water from the first unit and introducing it into the second unit, and so on throughout the battery, shutting off the acid water from the units in succession when the grain has been properly steeped, withdrawing the grain therefrom, refilling the same with grain and introducing acid water previously used into said bodies of fresh grain, introducing fresh acid water into the units containing the partially steeped grain, and heating the acid water at intervals as it flows through said battery, so as to maintain it at a temperature of from 105 degrees to 130 degrees Fahrenheit.

18. The process of steeping grain prior to grinding in the manufacture of starch, which consists in confining the grain in a battery of steep tanks, introducing into the first unit of said battery a dilute solution of sulfurous acid, withdrawing the acid water from the first unit and introducing it into the second unit, and so on throughout the battery, shutting off the acid water from the units in succession when the grain has been properly steeped, withdrawing the grain therefrom, refilling the same with grain and introducing acid water previously used into said bodies of fresh grain, introducing fresh acid water into the units containing the partially steeped grain, and injecting steam into the liquid at intervals in its course through the battery, so as to maintain it at a temperature of from 105 degrees to 130 degrees Fahrenheit.

ADOLPH W. H. LENDERS.

Witnesses:
P. H. TRUMAN,
H. L. PECK.